United States Patent [19]
Knepper et al.

[11] Patent Number: 5,150,126
[45] Date of Patent: Sep. 22, 1992

[54] TRANSMITTING AND RECEIVING PART OF A PULSE DOPPLER RADAR

[75] Inventors: Udo Knepper, Langenargen; Ralph Speck, Friedrichshafen, both of Fed. Rep. of Germany

[73] Assignee: Dornier GmbH, Fed. Rep. of Germany

[21] Appl. No.: 698,389

[22] Filed: May 10, 1991

[30] Foreign Application Priority Data

Feb. 18, 1991 [DE] Fed. Rep. of Germany ....... 4104907

[51] Int. Cl.⁵ .................... G01S 7/288; G01S 13/34
[52] U.S. Cl. .................... 342/137; 342/94; 342/194
[58] Field of Search ............... 342/137, 194, 136, 94, 342/95, 134, 135

[56] References Cited

U.S. PATENT DOCUMENTS

| | | | |
|---|---|---|---|
| 3,631,489 | 12/1971 | Cooper | 342/161 |
| 3,987,442 | 10/1976 | McLeod, Jr. | 342/162 |
| 4,042,925 | 8/1977 | Albanese et al. | 342/132 |
| 4,214,242 | 7/1980 | Colin | 342/137 |
| 4,328,495 | 5/1982 | Thue | 342/109 |
| 4,630,052 | 12/1986 | Galati et al. | 342/159 |
| 4,730,189 | 3/1988 | Siegel et al. | 342/104 |
| 4,975,706 | 12/1990 | Shrader | 342/160 |

*Primary Examiner*—John B. Sotomayor
*Attorney, Agent, or Firm*—Evenson, Wands, Edwards, Lenahan & McKeown

[57] ABSTRACT

A transmitting and receiving part of a pulse Doppler radar, in which the transmitting oscillator, by frequency shifting, is at the same time used as a local (reception) oscillator, and the intermediate-frequency reference frequency is generated coherently with respect to the pulse repetition frequency. Since only one high-frequency oscillator is required, the quality of which does not have to meet very high requirements, a low-price pulse Doppler radar can be implemented.

12 Claims, 2 Drawing Sheets

FIG. I

TRANSMITTING AND RECEIVING PART OF A PULSE DOPPLER RADAR

BACKGROUND OF THE INVENTION

The present invention relates to a transmitting and receiving part of a pulse Doppler radar having a transmitting oscillator which, with a pulse repetition frequency, generates radar pulses of a duration period, and an antenna coupled to the transmitting oscillator. A reception mixer is coupled to the antenna and generates intermediate frequencies, and there are means for generating an intermediate-frequency reference frequency. There is also an inphase mixer which generates I-signals, and a quadrature phase mixer which generates Q-signals.

Pulse radar systems which are suitable for generating Doppler signals require a detection device in which the phase and the frequency of the transmitted signal are used as references.

The standard solution for radars of high sensitivity and dynamics uses a phase-sensitive detector at the outlet of an intermediate frequency amplifier. The generating of the phase-stable intermediate-frequency reference signal requires significant equipment expenditures [coherent frequency generating system (M. I. Skolnik; Introduction to Radar Systems; McGraw Hill Publishing Company)].

Frequently, there is also the requirement that such a radar system minimize the interference of other radio services and by other radio services which operate in the same frequency channel. The expansion spectrum processes to be used for this purpose require considerable additional circuit-related expenditures.

SUMMARY OF THE INVENTION

An object of the present invention is to provide a coherently operating transmitting and receiving part for a pulse Doppler radar which generates Doppler signals from the lowest to the highest Doppler frequencies and produces high-resolution range gates (in the meter range).

This and other objects are achieved by a transmitting and receiving part of a pulse Doppler radar having a transmitting oscillator which, with a pulse repetition frequency, generates radar pulses of a duration period, and an antenna coupled to the transmitting oscillator. A reception mixer is coupled to the antenna and generates intermediate frequencies, and there are means for generating an intermediate-frequency reference frequency. An inphase mixer generates I-signals, and a quadrature phase mixer generates Q-signals. There are also means for frequency shifting coupled to the transmitting oscillator to cause the transmitting oscillator to also operate as a local reception oscillator, and the intermediate-frequency reference frequency is generated coherently with respect to the pulse repetition frequency.

According to the present invention, the transmitting oscillator is, by means of frequency shifting, used at the same time as the local oscillator. The intermediate-frequency reference frequency $f_r$ is generated coherently with respect to the pulse repetition frequency $f_p$.

The radar according to the present invention has an elegant construction and requires only one high-frequency transmitting oscillator. Only moderate demands are made on spectral purity and frequency constancy of this transmitting oscillator. It is therefore possible to use an oscillator with a low-quality resonator. An expensive oscillator with an echo box is not necessary. The transmitting and receiving circuit is therefore suitable for complete monolithic integration (MMIC). For this reason, the transmitting and receiving part according to the invention can be used as a radar front end for applications in which only little space is available such as in missiles or aircraft or in motor vehicles for range or distance measuring or for observing rear traffic.

With certain embodiments of the invention, decorrelating can be achieved of disturbing interference signals of common-channel radio services (in particular, by similar radars).

Other objects, advantages and novel features of the present invention will become apparent from the following detailed description of the invention when considered in conjunction with the accompanying drawings.

BRIEF DESCRIPTION OF THE DRAWINGS

Figure 1:
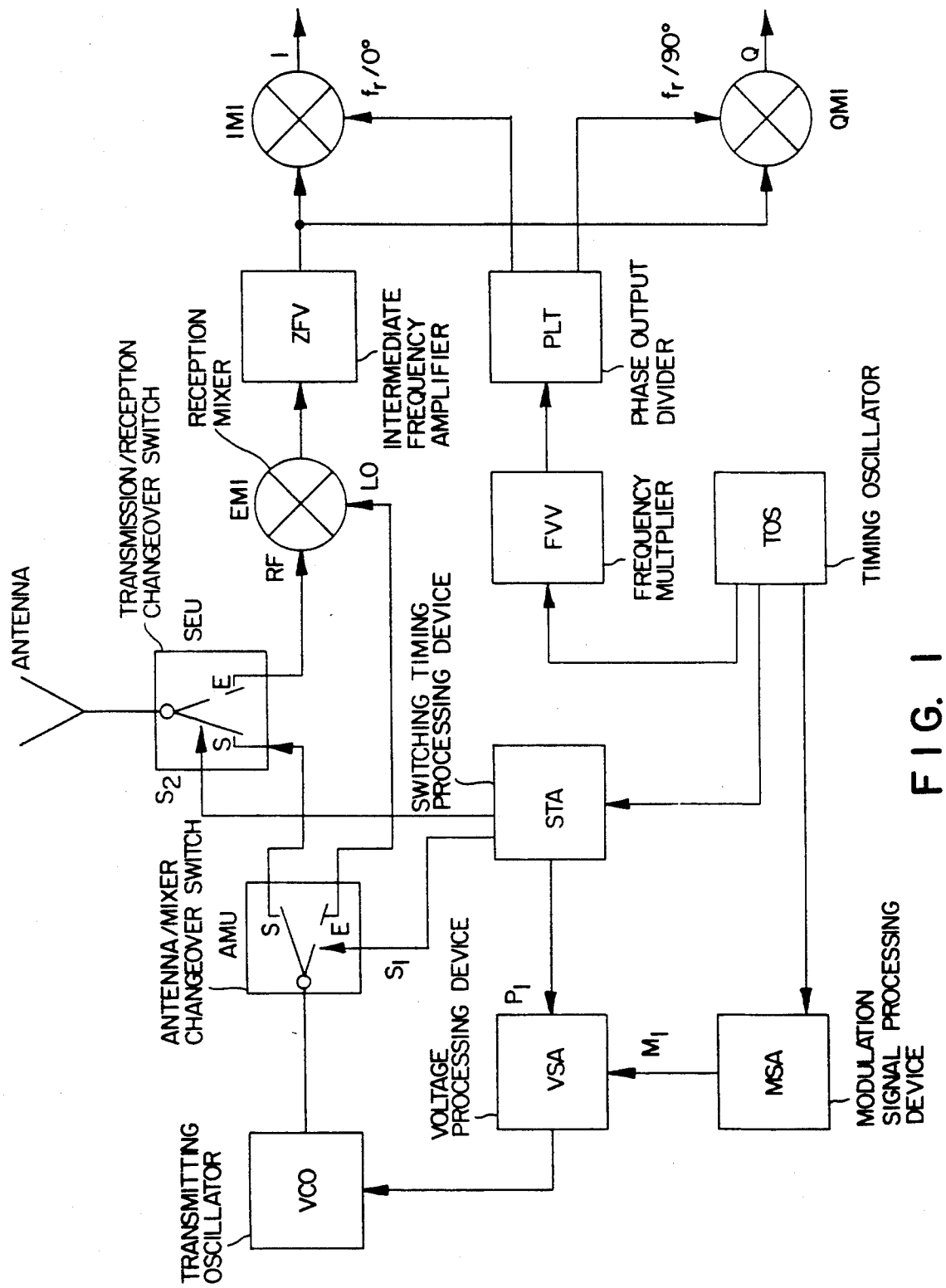
FIG. 1 is a block diagram of an embodiment of a transmitting and receiving part according to the present invention.

FIG. 1 shows a transmitting and receiving part with the components comprising a transmitting oscillator VCO (Voltage Controlled Oscillator), the pulses of which reach the antenna via an antenna/mixer change-over switch AMU and a transmission/reception change-over switch SEU. The echo signals received by the antenna are guided to a reception mixer EMI by the transmission/reception change-over switch SEU. There, they are mixed with the reference frequency LO (of the local oscillator, normally generated by the receiving oscillator) to form the intermediate frequency. By way of the intermediate frequency amplifier ZFV, the signals reach the inphase mixer IMI and the quadrature phase mixer QMI, from where they are guided to a digital or analog analysis device, which is not a part of the invention.

In order to achieve the coherence according to the invention between the intermediate-frequency reference frequency $f_r$ and the pulse repetition frequency $f_p$, a common timing oscillator TOS is provided in the illustrated embodiment from which both signals are derived. A shift of the transmitting oscillator VCO takes place by the modulation signal processing device MSA and the bias voltage processing device VSA. The control of the antenna/mixer change-over switch AMU and of the transmission/reception change-over switch SEU takes place by a switching timing processing device STA. The intermediate-frequency reference frequency $f_r$ is derived from the timing oscillator TOS by means of the frequency multiplier FVV. The phase output divider PLT transmits the reference signal for the inphase $f_r/0°$ and for the quadrature phase $f_r/90°$ to the mixers IMI and QMI.

The oscillator VCO may, for example, be a Gunn element oscillator, the frequency of which can be modulated by means of a varactor diode. A rectangular shift signal $p_1$ with the repetition frequency $f_p'$, which is fed to the varactor diode by the bias voltage processing device VSA, generates a frequency jump D of the oscillator signal during the transmission pulse duration period $t_s$. The peak voltage of the shift signal determines the extent of the frequency jump, according to the equation:

$$D = f_s - f_{LO}$$

wherein D (the frequency jump) is equal to the intermediate frequency $f_i$ of received target echo signals received at the reception mixer EMI; $f_s$ is the transmission frequency of the beamed transmission pulse of the relatively short duration $t_s$; and $f_{LO}$ is the beat frequency which is supplied to the reception mixer EMI during the relatively long duration of the echo reception time $t_e$.

The required signal paths from the transmitter to the antenna, from the antenna to the LO mixer inlet, and from the antenna to the RF mixer inlet are changed over by the change-over switches AMU and SEU in time with the repetition frequency $f_p$. The switches AMU and SEU may be semiconductor switches (preferably gallium arsenide FET) which can be manufactured in MMIC technology to be fast switching and to have a sufficiently high insulation.

An alternative solution, which is not shown illustrated, are configurations which use one coupler and circulator, two couplers, or one coupler and one change-over switch. Between the VCO and the EMI, one coupler and one circulator (in front of the antenna) or two couplers can therefore replace the components AMU and SEU. The first coupler will then, in each case, provide the mixer EMI with the frequency $f_{LO}$ and the coupler or the circulator at the antenna with the frequency $f_s$. These alternatives have the advantage of a purely passive solution and do not require any switching signals. Disadvantages are higher signal losses and the inferior insulation of the undesirable signal paths.

In the embodiment of FIG. 1, the switching signals $s_1$ and $s_2$ and the shift signal $p_1$, by means of the switching timing processing device STA, are derived from the central timing oscillator TOS.

A radar unit according to the invention receives an intermediate-frequency echo pulse signal from a fixed target that is assumed to be punctiform. The echo pulse signal consists of few periods when the transmitted pulse duration $t_s$ is only slightly larger than the intermediate-frequency period duration. This intermediate-frequency echo pulse signal has the characteristic according to the invention that it is coherent with the pulse repetition frequency $f_p$ irrespective of the carrier phase of the transmitting oscillator VCO at the point in time of the shift. According to the invention, it is this coherence which is utilized for obtaining pulse Doppler signals from moving targets in the base band.

For this purpose, an intermediate-frequency reference signal $f_r/0°$ and $f_r/90°$ is supplied to the I- and Q-mixers IMI and QMI for a homodyne beat, this reference signal, according to the invention, being coherent with the pulse repetition frequency $f_p$. In a manner that is already known, this coherence can be achieved in that the frequency $f_p$ and the reference frequency $f_r$ are derived from a common timing oscillator (TOS).

In the block diagram of FIG. 1, a frequency multiplier FVV is illustrated as a possible solution which multiplies the timing oscillator frequency to the intermediate-frequency reference frequency $f_r$. Through the phase output divider PLT, the reference frequency $f_r$ is supplied to the mixers IMI and QMI.

As an alternative, not shown, the reference frequency $f_r$ may also be obtained from a delayed signal portion of the transmitted pulse which is received at the beginning of the echo reception time $t_e$ at the ZF-outlet of the reception mixer EMI. As the delayed signal portion of the transmitted pulse, either the virtually always existing antenna echo signal may be used, or a signal portion is transferred in a defined manner from the transmission path into the reception path by means of two couplers and a delay line.

The mixer output signals I and Q comprise bipolar video pulses of a pulse width $t_s$ with the pulse repetition frequency $f_p$. In a known manner, they are processed in an analog or digital manner as pulse Doppler video signals.

Figure 2:
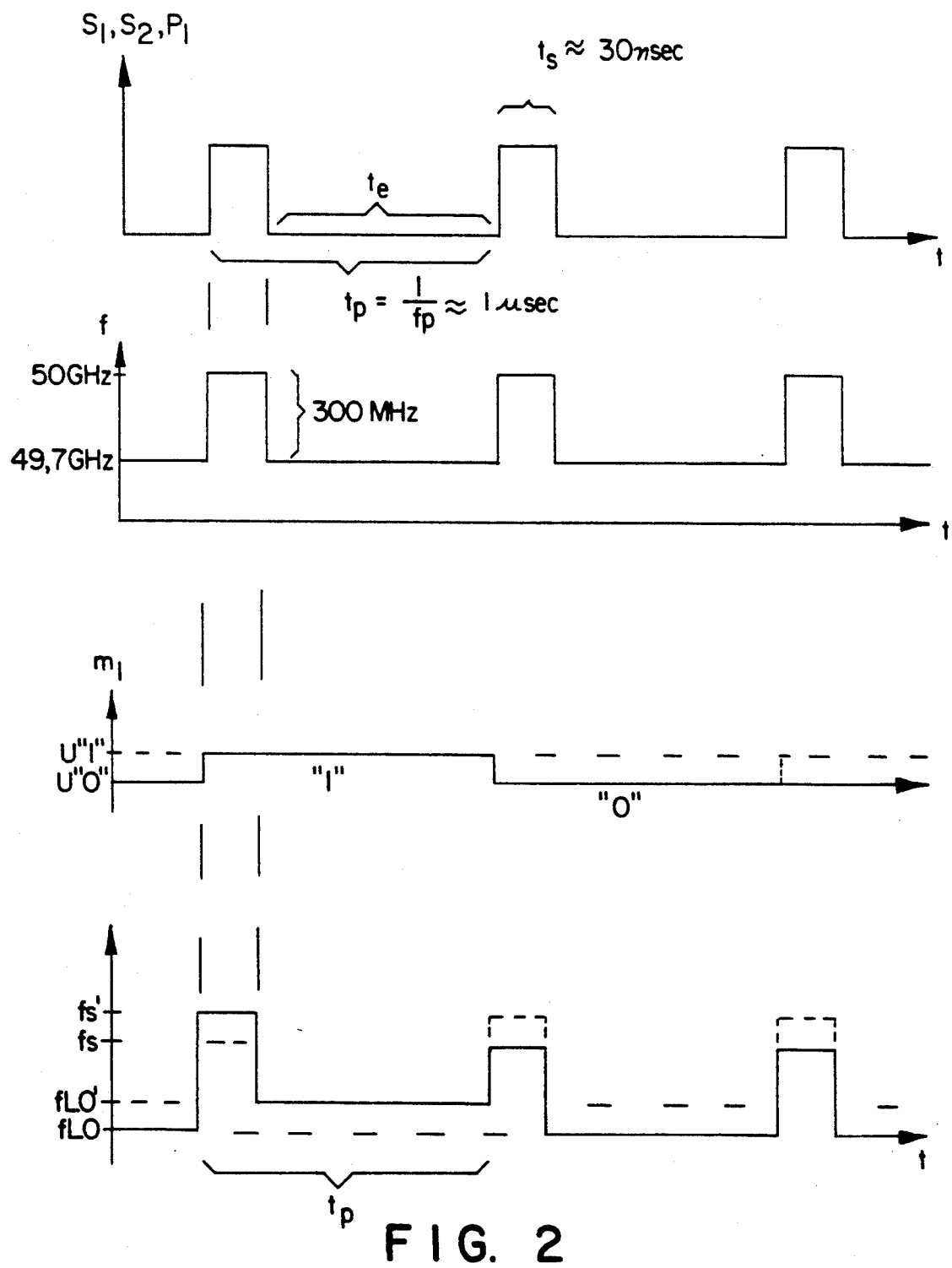
FIG. 2 is an illustration of several signal courses.

FIG. 2 shows several signal courses. In the uppermost diagram, FIG. 2 shows the switching signals $s_1$, $s_2$ and $p_1$ by which the components AMU, SEU and, by means of the VSA, also the VCO of FIG. 1 are controlled. Such a pulse has, for example, the pulse duration period $t_s$ of 30 nsec which corresponds to the transmitted pulse duration period. Such pulses are emitted with the pulse repetition frequency $f_p$. The duration period to the next pulse $t_p$ is approximately 1 μsec. The pulse repetition frequency $f_p$ in this case is at 1 MHz.

The second diagram shows the frequency of the transmitted pulse $f_s$ going to the antenna and the beat frequency $f_{LO}$. The transmission takes place, for example, for 30 nsec at 50 GHz. The reception takes place for the duration period $t_e$ to the next pulse after the change-over to $f_{LO}$ of 49.7 GHz. The pulse echo with the frequency 50 GHz therefore comes from the antenna at a time in which the transmitting oscillator VCO has already shifted again to 49.7 GHz. Thus, the echo signal in the reception mixer EMI is mixed with the LO frequency of 49.7 GHz, in which case the ZF mixed product of approximately 300 MHz is filtered out and further amplified (intermediate-frequency amplifier ZFV) and the signal of which is supplied in a parallel manner to the mixers IMI and QMI. There, together with the corresponding coherent ZF reference signals from the phase output divider PLT, it is mixed to the bipolar video signals I and Q. Coherence is obtained from the derivation of the reference signals, and also from the timing oscillator TOS. When the TOS operates, for example, with 25 MHZ, and the frequency multiplier FVV multiplies this frequency by twelve, 300 MHz are obtained, corresponding to the ZF-frequency.

The elements FVV and PLT, as well as other elements of the system, have a constant and arbitrary phase angle. Time-related phase variations which are small with respect to the lowest Doppler frequency do not interfere.

The initially mentioned requirement of the radar process of offering interference resistance against common-channel interference sources can be met by three measures which may be applied individually or at the same time. The first is noise modulation or pseudo noise modulation of the phase or frequency of the transmission oscillator VCO. The second is pseudo noise modulation of the pulse repetition frequency $f_p$. The third measure is amplitude limitation of individual interference pulses which may occur on an individual basis in a statistically distributed manner in spite of the first two measures mentioned above.

In the case of a process according to the first measure, a received interference signal is decorrelated already in the reception mixer EMI, and the remaining interference energy is suppressed by Doppler signal filtering. For the implementation of the first measure, the frequency modulation of the VCO has the advantage that no additional phase modulator must be used.

The two lower diagrams of FIG. 2 show a possible frequency modulation with the binary modulation signal $m_1$. This is generated in the modulation voltage processing device MSA by a (pseudo) random generator which is timed with the pulse repetition frequency $f_p$. It is synchronous with the frequency shift signal $p_1$ and is added to it in the bias voltage processing system VSA. The frequency sweep $f_s' - f_s = f_{LO}' - f_{LO}$, which is caused by the binary modulation signal $m_1$, is adjusted in such a manner that in the case of the logic "1", the pertaining phase swing, after the period duration $t_p$, reaches the value 180°. In the case of the logic "0", the frequency sweep (and the phase swing) is zero.

Instead of the binary modulation signal $m_1$, a (pseudo) noise signal can also be used which is stepped several times in the amplitude (corresponding to the frequency sweep) or which is continuous, on the condition that the respective amplitude step for the period duration $t_p$ remains constant and the maximal resulting phase swing has the value of approximately 360°.

The second measure falls under the term "staggered pulse repetition frequency" and is carried out as follows. As an expansion of the switching timing processing system STA, a number of staggered pulse period durations is provided which, controlled by a pseudo random generator, are called from one pulse to the next. The selection of parameters takes place on the condition that: a mean pulse repetition frequency is maintained; the grading of the pulse repetition frequencies corresponds to a range gate width; and a distribution of an interference signal energy to all range gates takes place that is as uniform as possible.

The third measure provides that interference signal pulses, which clearly exceed the level of the useful-signal pulses, are cut off by an amplitude limiting in the ZF-amplifier chain.

As a result of the first and second measures, the interference pulses can occur only relatively infrequently and in an isolated manner but with a very high amplitude. The amplitude limiting is therefore the appropriate device for the suppressing of interference signals while the useful signal loss is low.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A transmitting and receiving part of a pulse Doppler radar comprising:
    a transmitting oscillator which, with a pulse repetition frequency, generates radar pulses of a duration period;
    an antenna coupled to the transmitting oscillator;
    a reception mixer coupled to the antenna and which generates intermediate frequencies;
    means for generating an intermediate-frequency reference frequency;
    an inphase mixer which generates I-signals, and a quadrature phase mixer which generates Q-signals;
    means for frequency shifting coupled to the transmitting oscillator to cause the transmitting oscillator to also operate as a local reception oscillator, wherein the intermediate-frequency reference frequency is generated coherently with respect to the pulse repetition frequency.

2. An arrangement according to claim 1, wherein the means for frequency shifting includes a timing oscillator that produces a timing oscillator signal from which the pulse repetition frequency is derived as well as the intermediate-frequency reference frequency.

3. An arrangement according to claim 2, further comprising means for frequency multiplying coupled to the timing oscillator to produce the intermediate-frequency reference frequency from the timing oscillator signal.

4. An arrangement according to claim 2, further comprising phase lock loop means coupled to the timing oscillator to produce the intermediate-frequency reference frequency from the timing oscillator signal.

5. An arrangement according to claim wherein the intermediate-frequency reference frequency is obtained from a delayed signal portion of the transmitted pulse, and via a coupling-out member in the transmission path, a delay line and a coupling-in member in the reception path, a defined reference signal is coupled into the reception path.

6. An arrangement according to claim 5, wherein the delayed signal portion is the antenna echo signal.

7. An arrangement according to claim 5, further comprising a high-quality resonator for transforming the intermediate-frequency pulse reference signal to a continuous intermediate-frequency reference signal.

8. An arrangement according to claim 5, further comprising phase lock loop means for transforming the intermediate-frequency pulse reference signal to a continuous intermediate-frequency reference signal.

9. An arrangement according to claim 5, further comprising means for comparing the obtained continuous intermediate-frequency reference signal with the intermediate-frequency reference frequency derived from the pulse repetition frequency, and frequency regulating loop means for stabilizing a frequency shift sweep using the magnitude of error determined by the means for comparing.

10. An arrangement according to claim 1, further comprising means for suitably noise modulating the transmitting oscillator by means of phase or frequency modulation in such a manner that interference signals of outside transmitting apparatuses are optimally decorrelated and echo signals are not downgraded.

11. An arrangement according to claim 1, further comprising means for limiting an interference pulse in the chain of the intermediate frequency amplifier for interference amplitudes which noticeably exceed the level of useful signal pulses.

12. An arrangement according to claim 1, further comprising means for staggering the pulse repetition frequency for avoiding the analyzing of echoes from earlier pulses and for suppressing interference pulses with the parameters of the staggering being selected such that a distribution of the interference signal energy to all range gates takes place which is as uniform as possible.

* * * * *